United States Patent
Kim et al.

(10) Patent No.: US 9,455,578 B2
(45) Date of Patent: Sep. 27, 2016

(54) DIRECT CURRENT (DC) MICROGRID CHARGE/DISCHARGE SYSTEM FOR SECONDARY BATTERIES CONNECTED IN SERIES

(71) Applicants: LG CNS CO., LTD., Seoul (KR); HBL Corporation, Daejeon (KR)

(72) Inventors: Jeong Moog Kim, Seoul (KR); Hwan Hee Lee, Seoul (KR); Tae Hyoung Ryu, Seoul (KR); Dong Hoon Shin, Seoul (KR); Cheol Kyu Han, Seoul (KR)

(73) Assignees: HBL CORPORATION, Daejeon (KR); LG CNS CO., LTD., Seoul (KR)

( * ) Notice: Subject to any disclaimer, the term of this patent is extended or adjusted under 35 U.S.C. 154(b) by 150 days.

(21) Appl. No.: 14/226,412

(22) Filed: Mar. 26, 2014

(65) Prior Publication Data

US 2014/0292259 A1    Oct. 2, 2014

(30) Foreign Application Priority Data

Mar. 27, 2013   (KR) .................. 10-2013-0032882

(51) Int. Cl.
  *H02J 7/00*   (2006.01)
  *H02J 7/14*   (2006.01)
  (Continued)

(52) U.S. Cl.
  CPC .............. *H02J 7/00* (2013.01); *H02J 7/0014* (2013.01); *H02J 7/1423* (2013.01); *H02J 7/345* (2013.01);
  (Continued)

(58) Field of Classification Search
  USPC ...................................................... 320/107
  See application file for complete search history.

(56) References Cited

U.S. PATENT DOCUMENTS

2006/0261783 A1   11/2006   Gamboa et al.
2010/0066311 A1*   3/2010   Bao et al. .............. 320/162
(Continued)

FOREIGN PATENT DOCUMENTS

CN   101908824   12/2010
DE   10035959    4/2001
(Continued)

OTHER PUBLICATIONS

European Patent Office Application Serial No. 14161787.8, Search Report dated Jun. 24, 2014, 10 pages.
(Continued)

*Primary Examiner* — Suchin Parihar
(74) *Attorney, Agent, or Firm* — Lee Hong Degerman Kang & Waimey; Jonathan Kang; Jeffrey Lotspeich

(57) ABSTRACT

An algorithm and a direct current (DC) microgrid charge/discharge system with the algorithm are provided that noticeably increases charge/discharge voltage during charging and discharging by connecting a plurality of secondary batteries in series, compared to a single battery, that increases power conversion efficiency of a DC-to-DC (DC/DC) converter for charge/discharge power control by setting an appropriate voltage of a DC microgrid to be about twice a maximum voltage of a battery group, that enables charging and discharging to be stably performed regardless of a change in the battery group by adding a linear constant current source, that increases power conversion efficiency of the DC microgrid charge/discharge system by configuring a DC energy storage system (ESS) used for both charging and discharging with a combination of a typical electrolytic condenser and a super condenser or a group of the secondary batteries, and that simplifies the DC microgrid charge/discharge system.

9 Claims, 4 Drawing Sheets

(51) Int. Cl.
*H02J 7/34* (2006.01)
*B60L 11/18* (2006.01)

(52) U.S. Cl.
CPC .......... *B60L 11/1811* (2013.01); *B60L 11/1855* (2013.01); *B60L 11/1866* (2013.01); *Y02P 80/14* (2015.11); *Y02T 10/7005* (2013.01); *Y02T 10/7055* (2013.01); *Y02T 10/7061* (2013.01); *Y02T 10/7072* (2013.01); *Y02T 10/92* (2013.01); *Y02T 90/127* (2013.01); *Y02T 90/14* (2013.01)

(56) References Cited

U.S. PATENT DOCUMENTS

| | | | |
|---|---|---|---|
| 2011/0043160 A1* | 2/2011 | Serban | 320/101 |
| 2011/0140513 A1 | 6/2011 | Brookfield | |
| 2012/0056591 A1* | 3/2012 | Abe et al. | 320/132 |
| 2013/0099581 A1* | 4/2013 | Zhou et al. | 307/82 |
| 2014/0035371 A1* | 2/2014 | Weir et al. | 307/36 |
| 2014/0340092 A1* | 11/2014 | Kim et al. | 324/430 |
| 2015/0249350 A1* | 9/2015 | Tomita et al. | 320/108 |

FOREIGN PATENT DOCUMENTS

| | | |
|---|---|---|
| JP | 11-055866 | 2/1999 |
| JP | 2000-312442 | 11/2000 |
| JP | 2003-087987 | 3/2003 |
| JP | 2011-109901 | 6/2011 |
| WO | 2004/030177 | 4/2004 |
| WO | 2009/131336 | 10/2009 |
| WO | 2010/084494 | 7/2010 |
| WO | 2010/087608 | 8/2010 |

OTHER PUBLICATIONS

Japan Patent Office Application Serial No. 2014-063031, Office Action dated Mar. 3, 2015, 3 pages.
The State Intellectual Property Office of the People's Republic of China Application Serial No. 201410116756.2, Office Action dated Sep. 6, 2015, 7 pages.

* cited by examiner

DIRECT CURRENT (DC) MICROGRID CHARGE/DISCHARGE SYSTEM FOR SECONDARY BATTERIES CONNECTED IN SERIES

CROSS-REFERENCE TO RELATED APPLICATION

Pursuant to 35 U.S.C. §119(a), this application claims the benefit of earlier filing date and right of priority to Korean Patent Application No. 10-2013-0032882, filed on Mar. 27, 2013, the contents of which are hereby incorporated by reference herein in its entirety.

BACKGROUND

1. Field of the Invention

The present invention relates to an algorithm and a direct current (DC) microgrid charge/discharge system with the algorithm that noticeably increases charge/discharge voltage during charging and discharging by connecting a plurality of secondary batteries in series, compared to a single battery, that increases power conversion efficiency of a DC-to-DC (DC/DC) converter for charge/discharge power control by setting an appropriate voltage of a DC microgrid that directly uses discharged electricity in a DC state to perform charging to be about twice a maximum voltage of a battery group, that increases power conversion efficiency of the DC microgrid charge/discharge system by configuring a DC energy storage system (ESS) with a combination of a typical electrolytic condenser and a super condenser or a group of the secondary batteries, and that simplifies the DC microgrid charge/discharge system.

2. Description of the Related Art

A microgrid refers to a localized power supply system.

Large-capacity lithium secondary batteries used in electric vehicles each have a relatively low operating voltage, for example, a voltage of about 2 volts (V) to about 4.7 V, and a relatively high operating current, for example, a current of about 25 amperes (A) to about 50 A.

In an electric vehicle, tens to hundreds of large-capacity lithium secondary batteries are connected and used. In a process of manufacturing a battery assembly, a battery of a unit module (for example, a single battery, or a few batteries are connected in parallel or in series) needs to be charged and discharged at a maximum capacity. However, there are several technical difficulties, due to low conversion efficiency for converting electric energy of a battery with a relatively low voltage to an alternating current (AC) of a nationwide grid with a relatively high voltage, and for recycling the electric energy.

In a related art, in a system for simultaneously charging and discharging a large-capacity secondary battery in a switch mode, a single lithium secondary battery with an operating voltage of about 2 V to about 4.7 V may be discharged. Electricity obtained by the discharging needs to be regenerated in a nationwide AC grid by consuming the electricity as heat, or by converting the electricity to AC electricity.

A direct current (DC)-to-AC (DC/AC) converter used to regenerate power may have extremely low conversion efficiency, for example typically 40%, since a voltage of a single battery is considerably lower than a voltage of a commercial AC grid (for example, 220 V or 380 V). During conversion, remaining energy may be consumed as heat in the DC/AC converter.

Accordingly, a process of using a conventional charge/discharge apparatus is known to use the most power in a factory of manufacturing batteries including conditioning equipment for cooling.

In a typical apparatus for charging/discharging a battery, a constant current (CC) scheme, a constant voltage (CV) scheme, or a constant power scheme may be performed. In a large-capacity battery, the CC scheme may be mainly used.

A secondary battery charging and discharging system for enabling AC regeneration and DC regeneration in charging and discharging of a secondary battery, and an operation method thereof are disclosed in Korean Patent Publication No. 10-2012-0103337 as a related art. On the other hand, in the present invention, a plurality of secondary batteries may be connected in series, and power conversion efficiency may be increased using a bidirectional DC/DC converter and a constant current source. Additionally, in the present invention, a charge/discharge system may be miniaturized, and charging and discharging may be performed regardless of the number of batteries connected in series. Thus, Korean Patent Publication No. 10-2012-0103337 is significantly different from the present invention.

A technical configuration for enhancing accuracy of charging control of a secondary battery with a less change in a terminal voltage based on a change in a state of charge (SOC) is disclosed in Korean Patent Publication No. 10-2010-0119574 as a related art. On the other hand, in the present invention, a plurality of secondary batteries may be connected in series, and power conversion efficiency may be increased using a DC/DC converter and a constant current source. Additionally, in the present invention, a charge/discharge system may be miniaturized, and charging and discharging may be performed regardless of the number of batteries connected in series. Thus, Korean Patent Publication No. 10-2010-0119574 is significantly different from the present invention.

Additionally, a technical configuration including discharge route circuits for each of secondary batteries connected in series and for protecting overcharge is disclosed in Korean Patent Publication No. 10-2010-0122911 as a related art. However, because each of the secondary batteries includes a separate discharge resistor and a switching element to form a discharge route circuit, power consumption, and manufacturing costs may increase.

SUMMARY

An aspect of the present invention is to increase power conversion efficiency of a direct current (DC)-to-DC (DC/DC) converter by connecting, in series, large-capacity lithium secondary batteries used in an electric vehicle, and to perform charging and discharging, because each of the large-capacity lithium secondary batteries may have a relatively low operating voltage, for example, a voltage of about 2 V to about 4.7 V, and a relatively high current, for example, a current of about 25 A to about 50 A, and because when the large-capacity lithium secondary batteries are charged and discharged individually or in parallel, power conversion efficiency may be greatly reduced due to a low voltage compared to a voltage of a commercial nationwide grid.

Another aspect of the present invention is to increase a conversion resolution and energy conversion efficiency during power control by setting an appropriate voltage of a DC microgrid charge/discharge system to be twice a maximum voltage of both ends of a battery group including batteries connected in series, and to enable the DC microgrid charge/discharge system to stably operate by configuring a DC energy storage system (ESS) with a combination of a typical electrolytic condenser and a super condenser or a group of the secondary batteries.

Still another aspect of the present invention is to reduce a size and a weight of a whole system for charging and discharging, to reduce manufacturing costs, and to minimize installation space, by configuring a constant current power supply as a power source for charging, and by enabling a single power supply to stably operate regardless of a number of batteries for charging and discharging, based on a change in a load, that is, a frequent change in a configuration of a battery group to be charged.

Yet another aspect of the present invention is to allow a discharged DC source to be used to perform charging without a change, to dramatically reduce power waste caused by discharging, and to enable a factory to be operated in connection with a DC ESS despite power outage for a predetermined period of time.

According to an aspect of the present invention, there is provided a DC microgrid charge/discharge system for simultaneously charging and discharging a plurality of secondary batteries connected in series, as a constant current source through a single bidirectional DC/DC converter, using electric energy that is supplied from a commercial power source and is stored in an ESS through a bidirectional DC-to-alternating current (AC) (DC/AC) converter in an apparatus for charging and discharging a battery group including the plurality of secondary batteries. The ESS may be configured to store and supply the electric energy.

According to another aspect of the present invention, there is provided a DC microgrid charge/discharge system for storing power with a DC state in a DC ESS despite charging and discharging not being simultaneously performed, and for enabling the stored power to be used in a bidirectional DC/DC converter in the DC state, and for preventing a loss caused by power conversion, because electricity obtained by discharging may be used in a DC charging circuit without a change when charging and discharging are simultaneously performed in a system employing a DC microgrid scheme using the bidirectional DC/DC converter.

According to another aspect of the present invention, there is provided a DC microgrid charge/discharge system for setting an appropriate voltage of the DC microgrid charge/discharge system to be about twice a maximum voltage of both ends of a battery group in which batteries are connected in series, to achieve optimum energy conversion efficiency, and for increasing power conversion efficiency of a DC/DC converter including an electronic circuit and a typical semiconductor, because power is converted at a charge/discharge voltage that is considerably higher than a voltage of a single battery (for example, a voltage of 2 V to 4.7 V). For example, when 25 batteries are connected in series, the total voltage of 50 V to 117.5 V may be measured.

Effect

According to embodiments of the present invention, to increase power conversion efficiency of a direct current (DC)-to-DC (DC/DC) converter by converting power using a voltage obtained by connecting, in series, a plurality of large-capacity lithium secondary batteries used in an electric vehicle, because each of the large-capacity lithium secondary batteries may have a relatively low operating voltage, for example, a voltage of about 2 V to about 4.7 V, and a relatively high current, for example, a current of about 25 A to about 50 A, and because when the large-capacity lithium secondary batteries are charged and discharged individually or in parallel, power conversion efficiency may be greatly reduced due to a low voltage.

Additionally, according to embodiments of the present invention, to achieve optimum energy conversion efficiency, it is possible to set an appropriate voltage of a DC microgrid charge/discharge system to be twice a maximum voltage of a battery group including batteries connected in series, to configure a DC energy storage system (ESS) with a combination of a typical electrolytic condenser and a super condenser or a group of the secondary batteries, and to enable the DC microgrid charge/discharge system to stably operate.

Furthermore, according to embodiments of the present invention, it is possible to reduce a size and a weight of a whole system for charging and discharging, to reduce manufacturing costs, and to minimize installation space, by configuring a constant current power supply as a power source for charging, and by enabling a single power supply to stably operate regardless of a number of batteries for charging and discharging, based on a change in a load, that is, a frequent change in a configuration of a battery group to be charged.

Moreover, according to embodiments of the present invention, it is possible to allow a discharged DC source to be used to perform charging without a change, to dramatically reduce power waste caused by discharging, and to enable a factory to be operated in connection with a DC ESS despite power outage for a predetermined period of time.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
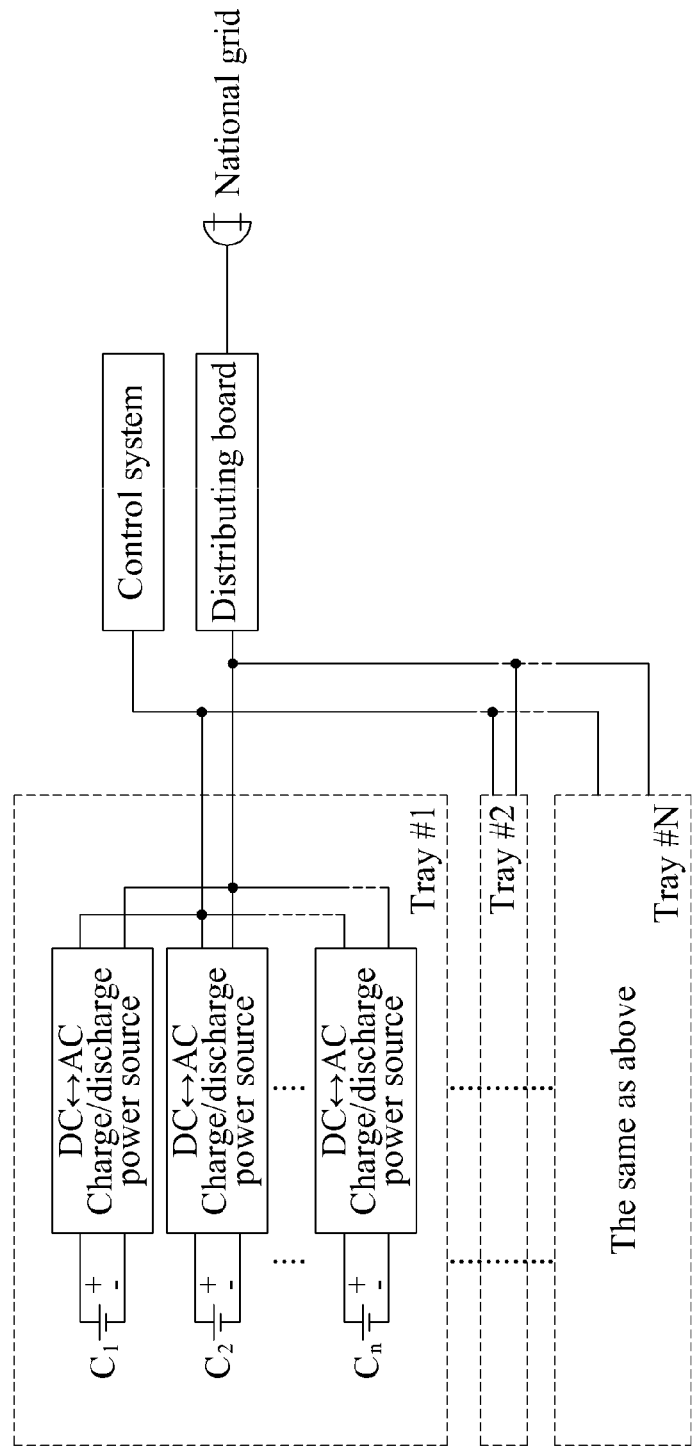
FIG. 1 is a diagram illustrating a charge/discharge system according to a related art.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

The present invention relates to a direct current (DC) microgrid charge/discharge system for charging and discharging each of a plurality of lithium secondary batteries that are connected in series in a battery group. The DC microgrid charge/discharge system may increase power conversion efficiency by converting a voltage increased by connecting in series tens to hundreds of batteries, each having a relatively low voltage (for example, a voltage of 2 volts (V) to 4.7 V), using a bidirectional DC-to-DC (DC/DC) converter. Additionally, the DC microgrid charge/discharge system may set a voltage of a DC microgrid to be about twice a maximum voltage of the battery group, and may achieve optimum energy conversion efficiency. Furthermore, the DC microgrid charge/discharge system may recycle power of a discharged battery so that the recycled power may be used to perform charging without a loss.

For example, when charging and discharging are simultaneously performed in a predetermined system, a DC microgrid scheme according to embodiments of the present invention may enable electricity discharged from a discharger to be used in a charging circuit while maintaining a DC state, and may prevent a loss caused by converting the electricity to an alternating current (AC) power source. In a typical process of manufacturing a battery, charging and discharging may be simultaneously performed in the same factory.

Additionally, to increase conversion efficiency between a DC and an AC, and to increase electricity efficiency during charging and discharging of a battery group, an area of an operating voltage of an appropriate DC microgrid system may need to be determined. It is obvious that power conversion efficiency increases, compared to using a single battery, when an operating voltage is increased by connecting a plurality of batteries in series.

By adding a DC energy storage system (ESS), and the like to a DC microgrid charge/discharge system according to embodiments of the present invention, power may be stored in a DC state, and may be used in the DC state, despite charging and discharging not being necessarily performed at the same time. Hereinafter, embodiments of the present invention will be further described.

Embodiments

Figure 2:
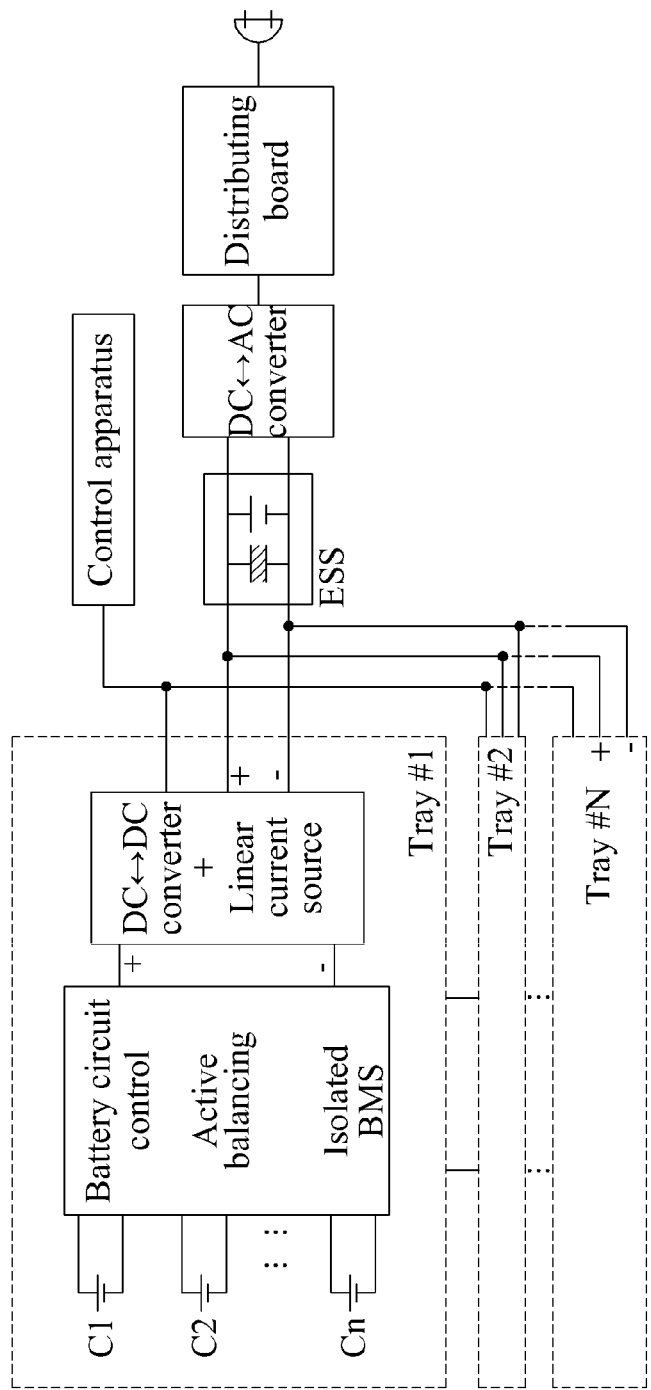
FIG. 2 is a diagram illustrating a direct current (DC) microgrid charge/discharge system according to an embodiment of the present invention.

Embodiments of the present invention will be further described with reference to the drawings. FIG. 1 illustrates a charge/discharge system according to a related art. FIG. 2 illustrates a DC microgrid charge/discharge system according to an embodiment of the present invention.

The DC microgrid charge/discharge system of FIG. 2 may refer to a single charge/discharge power supply with a large capacity. The charge/discharge system of FIG. 1 may require the same number of bidirectional DC-AC charge/discharge power sources as the number of batteries.

Accordingly, compared to the charge/discharge system of FIG. 1, manufacturing costs of the DC microgrid charge/discharge system of FIG. 2 may be reduced, and the DC microgrid charge/discharge system of FIG. 2 may have a significantly low weight and an extremely small size, and may also occupy an extremely small space during installation.

In the present disclosure, the terms "charging and discharging" and "charge/discharge" may be interchangeably used with respect to each other.

Additionally, the terms "DC ESS" and "ESS" may be interchangeably used with respect to each other.

In addition, the terms "lithium secondary battery," "secondary battery," and "battery" may be interchangeably used with respect to each other.

Referring to FIG. 2, a commercial power source may be input through a distributing board. The commercial power source supplied through the distributing board may be stored in a DC ESS through a bidirectional AC-to-DC (AC/DC) converter.

The DC ESS may connect electrolytic condensers and/or super condensers in series or in parallel, and may have a required voltage and capacity. Each of the electrolytic condensers and/or super condensers may have a capacity of hundreds of faraday (F).

Accordingly, power may be stored in the ESS in a DC state during discharging, despite charging and discharging not being necessarily performed at the same time. The power stored in the DC state may be directly used to perform charging, without a loss of conversion.

As shown in FIG. 2, the DC microgrid charge/discharge system may be configured to charge and discharge a battery group in which a large number of lithium secondary batteries are connected in series on tens to hundreds of trays, using a single ESS and a control apparatus.

Figure 3:
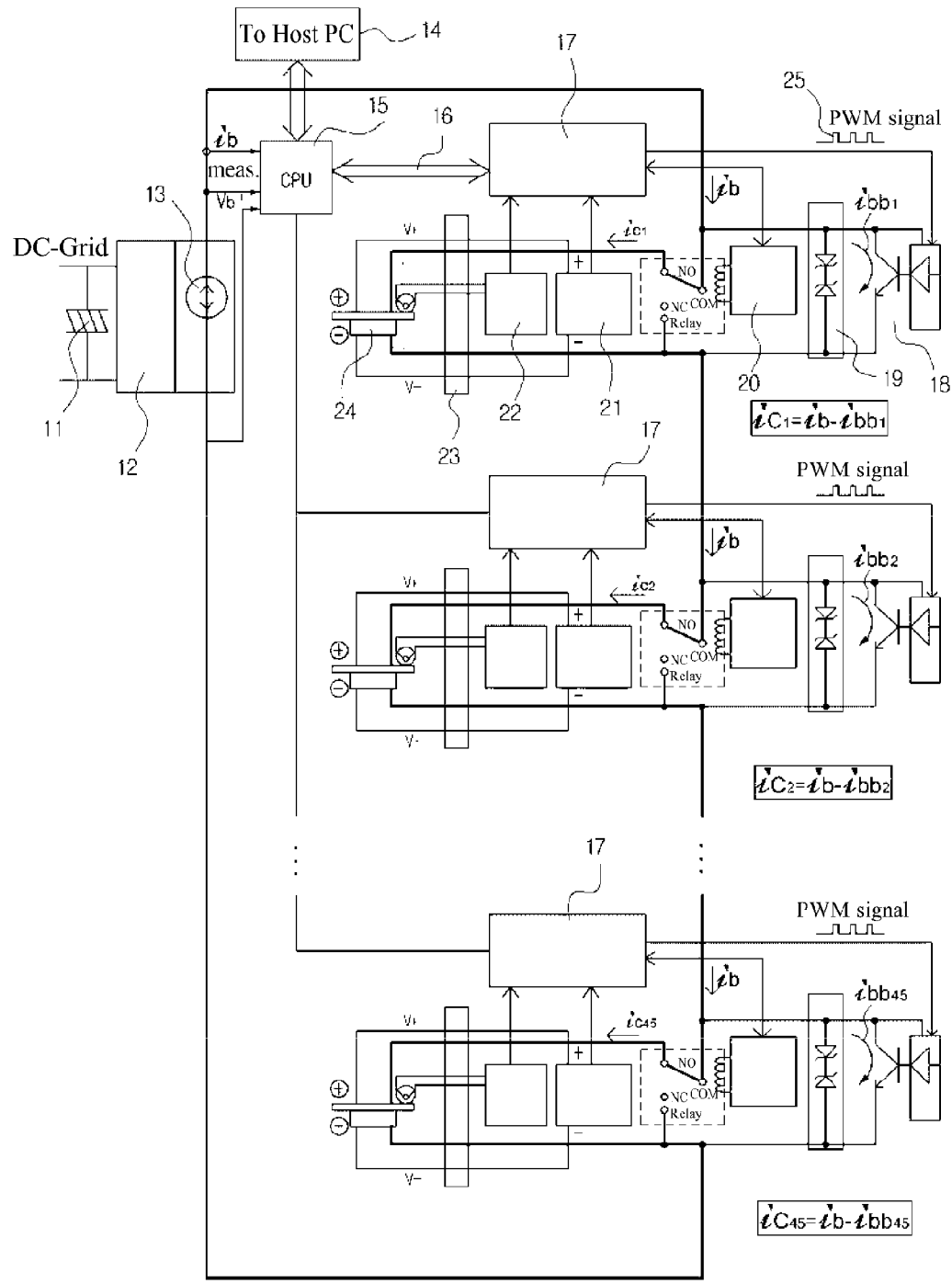
FIG. 3 is a diagram illustrating a tray of the DC microgrid charge/discharge system of FIG. 2.

Referring to FIG. 3, a power source output through a DC ESS 11 may be generated as a constant current source in a linear current source 13 through a bidirectional DC/DC converter 12, so that each battery may be charged and discharged. The bidirectional DC/DC converter 12 may be installed in each of trays.

The bidirectional DC/DC converter 12 employed in the DC microgrid charge/discharge system may be designed and manufactured according to embodiments of the present invention. The bidirectional DC/DC converter 12 may be configured to simultaneously charge and discharge a plurality of batteries connected in series, based on a change in a load.

The linear current source 13 may be a constant current source to further stabilize charge/discharge current, and to more stably control and supply current despite a change in a load in a final power source supplied to charge and discharge a plurality of batteries connected in series. Accordingly, by adding the linear current source 13, it is advantageously possible to increase accuracy and stability during controlling of charging and discharging of a battery, compared to an apparatus employing only the bidirectional DC/DC converter 12.

The DC ESS 11 may function to stably supply electricity to the bidirectional DC/DC converter 12. Additionally, during power outage for a predetermined period of time, the DC ESS 11 may enable charging and discharging to be continuously performed, by stably supplying electricity to the bidirectional DC/DC converter 12.

The DC ESS 11 may include, for example, an apparatus capable of supplying required power to the bidirectional DC/DC converter 12 in real time, while storing power received from the commercial power source in real time.

The bidirectional DC/DC converter 12 and the linear current source 13 may be installed in each of the trays, so that each of a plurality of batteries 24 connected in series may be charged and discharged.

Charging and discharging may be performed using the linear current source 13 and accordingly, it is possible to stably perform charging and discharging, regardless of the number of the batteries 24. Thus, it is possible to efficiently charge and discharge tens to hundreds of batteries, regardless of a change in voltage based on the number of batteries that are connected in series.

Additionally, according to embodiments of the present invention, a voltage may be increased by the number of batteries that are connected in series and accordingly, power conversion efficiency of the bidirectional DC/DC converter 12 may be remarkably increased.

In a system configured to simultaneously charge and discharge a plurality of batteries, for example the batteries 24, power may be converted by increasing a voltage of both ends of a battery group by connecting plurality of batteries in series and accordingly, energy efficiency may be increased over 80%. Thus, it is possible to obtain an advantageous effect of saving a large amount of energy.

To achieve optimum energy conversion efficiency and to increase a resolution during power control, a DC microgrid system according to embodiments of the present invention may be desirably configured to set an appropriate voltage of the DC microgrid system to be about twice a maximum voltage of both ends of a battery group including batteries connected in series. However, the appropriate voltage may be changed.

A technical configuration according to embodiments of the present invention will be further described with reference to FIG. 3.

FIG. 3 illustrates an example of one of the trays of FIG. 2. A single tray may include a controller 17, and a microprocessor, for example, a central processing unit (CPU) 15. The controller 17 may control charging and discharging of each of the batteries 24 connected in series. The CPU 15 may be connected to the controller 17 and a communication unit 16, and may control the controller 17.

The controller 17 may be installed in each of the batteries 24 as shown in FIG. 3, however, this is merely an example to facilitate understanding of the present invention. In FIG. 3, equally assigning a number of "1" may indicate identical controllers.

To efficiently and stably charge and discharge each of the batteries 24, a sensor including a thermometer, a voltmeter, and an ammeter may be installed in a required position, and the controller 17 may be configured to receive, from the sensor, a measured temperature and a measured voltage of a battery, for example an open circuit voltage (OCV), and a current, a voltage and the like of a circuit.

The controller 17 may control charging and discharging to be stably and quickly performed based on the current, the temperature, the voltage, and the like that are received from the sensor.

To efficiently control charging and discharging, $V_b$, ib, $ibb_1$ to $ibb_{45}$, a voltage between both ends of a battery, a temperature of a battery, and the like may be to be measured.

Each of the batteries 24 may include an isolated battery management system (BMS) configured to precisely measure a voltage, a current, a temperature, and the like that indicate a state of each of the batteries 24 when the batteries 24 are isolated from each other.

A control program may be loaded in a memory of the controller 17. The control program may include a unit that is designed and manufactured according to embodiments of the present invention and that is configured to efficiently, simultaneously charge and discharge the batteries 24 with different capacities, using the linear current source 13.

The CPU 15 installed in each of the trays may be connected to the control apparatus of FIG. 2, for example, a host personal computer (PC) 14, and may be configured to exchange signals with the host PC 14 using a wired or wireless communication unit.

In embodiments of the present invention, a main circuit used to perform charging and discharging may be represented by a bold black line of FIG. 2, and it may be easily understood that charging and discharging are performed while a constant current supplied from a linear current source passes through each of batteries connected in series.

The batteries 24 may have different capacities and different charge/discharge characteristics for each manufacturer. Also, batteries manufactured by the same manufacturer may have different capacities and different characteristics.

When batteries having different characteristics are simultaneously charged in series, charging may not be performed under the same condition. This is because, when a large-capacity battery, and a small-capacity battery are charged under the same condition, the small-capacity battery may reach a desired charging condition, earlier than the large-capacity battery, and when charging continues to be performed, the batteries may be exploded due to excess of a maximum voltage. When batteries with different internal resistances despite the same capacity are simultaneously charged and discharged in series, a similar problem may occur.

Accordingly, it is very important to simultaneously charge batteries connected in series in a single tray, using an appropriate power or voltage, based on a characteristic and a capacity of each of the batteries, while preventing occurrence of the above problem.

According to embodiments of the present invention, to stably and efficiently charge and discharge secondary batteries connected in series, a temperature of each of the secondary batteries may be measured using a temperature sensor, a voltage between both ends of each of the secondary batteries (for example, a real-time voltage, or an OCV) may be measured, and the measured temperature and the measured voltage may be transmitted to a controller. When the measured temperature and the measured voltage reach a set temperature and voltage, the controller may control a relay to be turned on or off, or may allow an active balancing circuit to perform controlling.

When a plurality of batteries are charged and discharged, the controller 17 may control charging and discharging based on a capacity, and a characteristic including an internal resistance value of each of the batteries. When a wide control range is set during the charging, a relay may control charging and discharging. Additionally, when a fine control is required, an active balancing circuit 18 of FIG. 3 may operate to control charging and discharging.

When the controller 17 controls a duty ratio and a frequency of a pulse width modulation (PWM) signal 25, and outputs the PWM signal to the active balancing circuit 18, the active balancing circuit 18 may control a current $ibb_1$ between both ends of a relay by turning on or off a switching element of the active balancing circuit 18, and may control a value of a current $ic_1$ flowing to a $1^{st}$ battery.

For example, when a plurality of secondary batteries that are connected in series and that have different internal resistances or different capacities are charged in a constant voltage (CV) mode, the active balancing circuit 18 may open and close a charging current of each of the secondary batteries based on a PWM signal output from the controller 17, or may compute the PWM signal to a DC, and may consume or bypass a part of the charging current.

Referring to FIG. 3, a protection circuit may be installed between both ends of a relay. The protection circuit may prevent a current flow from being interrupted due to opening of a circuit when a relay moves from a contact to another contact, may prevent a contact from being damaged by a spark generated when the contact is open, may increase durability of the relay, and may induce a stable operation of the circuit.

In other words, the protection circuit may prevent opening of the circuit and damage of the contact by bypassing a current immediately when the relay is open, so that the circuit may stably operate and the durability of the relay may increase.

The protection circuit may include a diode or a bidirectional zener diode with a large capacity, a condenser, a resistor, and the like.

Referring to FIG. 3, a relay controller 20 may be installed in each of the batteries 24, and may control a current flowing to each of the batteries 24 by opening or closing the relay based on a control signal of the controller 17.

Additionally, a terminal connection unit 23 may correspond to a terminal connected to charge and discharge each of batteries connected in series.

Figure 4:
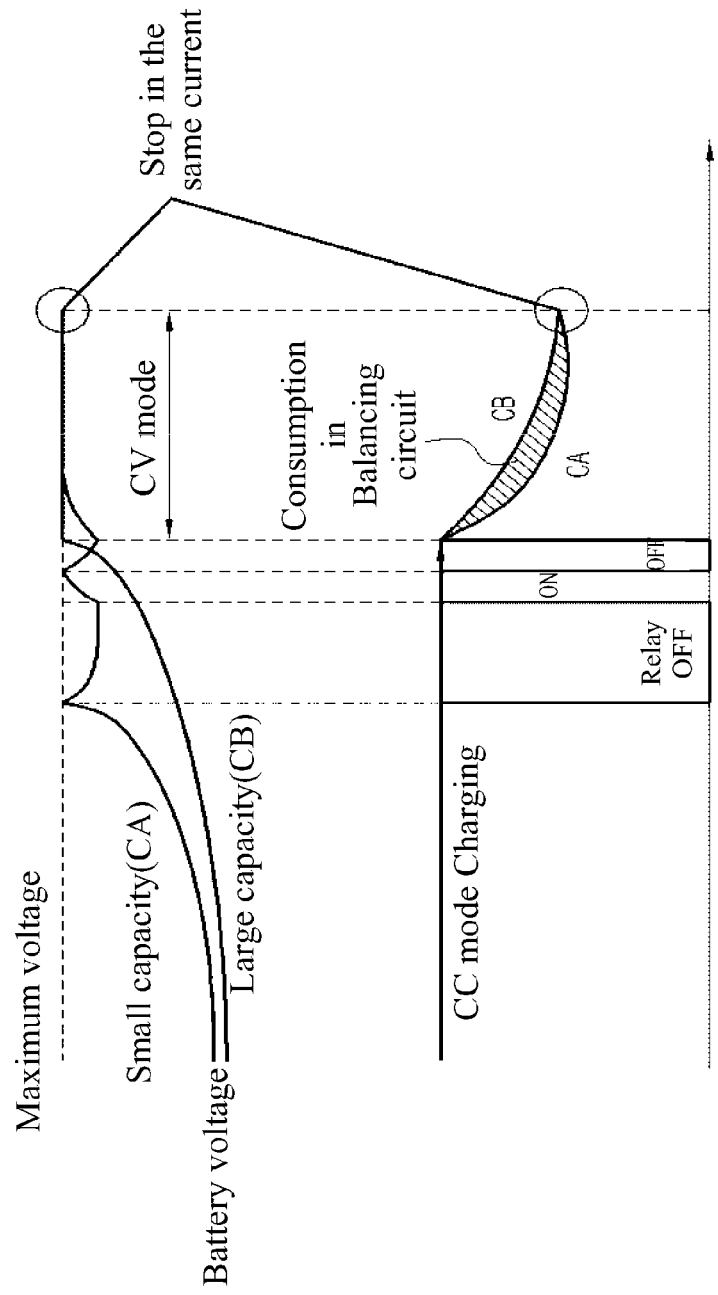
FIG. 4 illustrates a charge/discharge principle of a DC microgrid charge/discharge system according to an embodiment of the present invention.

Based on FIGS. 3 and 4, the relay and the active balancing circuit 18 may be used as important technical components in embodiments of the present invention. Using the relay and the active balancing circuit 18, charging of secondary batteries having different capacities and different characteristics including internal resistance may be completed at the maximum voltage in a charging completion current state that is set in advance.

Hereinafter, description is provided with reference to FIG. 4.

FIG. 4 illustrates a technical configuration of charging tens to hundreds of secondary batteries in a single tray in an optimum state at the same time by a control program loaded in a controller according to an embodiment of the present invention.

The "charging of the secondary batteries in the single tray in the optimum state" may indicate repeating charging and discharging of each of batteries connected in series at a maximum voltage by turning on or off a relay in a constant current (CC) mode until a battery with a largest capacity among the batteries lastly reaches the maximum voltage.

In other words, when all of the batteries in the tray reach the maximum voltage, a CV mode may be performed. When all the batteries in the tray reach a charging completion current that is set in a memory, charging may be completed.

The above control may be performed under a control of the controller based on a value measured by the above-described sensor, by a control program loaded in a memory of the controller.

Referring to FIG. 4, two batteries are assumed to have different capacities, and the same internal resistance. By using a charge/discharge system according to embodiments of the present invention, the two batteries may be controlled in the CC mode until a large-capacity battery reaches a maximum voltage. The other battery, that is, a small-capacity battery may reach the maximum voltage, earlier than the large-capacity battery. When reaching the maximum voltage, charging and discharging may continue to be performed by turning on or off a relay.

When reaching the maximum voltage, the large-capacity battery may operate in the CV mode, and a duty ratio of an active balancing circuit may be controlled so that a voltage of the small-capacity battery may not exceed a set maximum voltage value. When the two batteries reach a charging completion value indicating that currents input to all the batteries are set to be identical to each other at the maximum voltage, charging may be completed.

The above-described controlling may be performed under the control of the controller. The controller may measure a voltage of both ends of each of batteries during charging. When the measured voltage reaches a maximum voltage, the controller may turn off the relay and may prevent a current from flowing to a corresponding battery, so that the charging may not be performed.

An operation of charging a battery by turning on a relay when a voltage of the battery continuous to be measured and is determined to be reduced to a set voltage may be repeated until a point in time at which a last battery among a plurality of batteries connected in series in a single tray reaches a maximum voltage.

Controlling may be performed by switching to the CV mode after the point in time. The CV mode may be enabled in a set maximum voltage area of FIG. 4.

In the CV mode, controlling may be performed by the active balancing circuit 18 of FIG. 3, and the value of the current $ic_1$ flowing to the $1^{st}$ battery may be obtained by subtracting a value of the current $ibb_1$ from a value of a current ib.

Similarly, a value of a current $ic_2$ flowing to a $2^{nd}$ battery may be obtained by subtracting a value of a current $ibb_2$ from the value of the current ib, and a value of a current $ic_{45}$ flowing to a $45^{th}$ battery may be obtained by subtracting a value of a current $ibb_{45}$ from the value of the current ib.

When a condition of a preset charging completion current value, for example $ic_1 = ic_2) \ldots = ic_{45} =$, is satisfied, charging is completed in a CV mode.

For example, when all batteries connected in series in a single tray have the maximum voltage of FIG. 4 and the same current as the preset charging completion current value, charging of all the batteries may be completed.

When the relay is turned off in a corresponding battery, a current may flow directly to a battery disposed in a lower side of the corresponding battery.

The active balancing circuit 18 of FIG. 3 may include a control element, for example, a switching element, a plurality of circuit elements, and the like, may operate under the control of the controller 17, and may be controlled by several methods that will be described below.

In an embodiment, when a controller supplies a PWM signal to a gate terminal of a switching element, an active balancing circuit may turn on and off a gate (that is, a base), and may control a current flowing in both ends of a corresponding battery (for example, currents $ibb_1$ to $ibb_{45}$).

In another embodiment, an active balancing circuit may control a current control circuit to convert a PWM signal output from a controller to a current that is in proportion to a duty ratio, and to directly supply the current, and an equal effect may be generated. The above method may have an advantageous effect of preventing electric noise from being generated when the active balancing circuit operates.

Referring back to FIG. 3, to control a current flowing to each of the batteries 24 (for example, currents $ic_1$ to $ic_{45}$) in the CV mode, the controller 17 may control a duty ratio and a frequency of a PWM signal, may supply the PWM signal, and may control a current flowing in both ends of each of the batteries 24 (for example, the currents $ibb_1$ to $ibb_{45}$). When currents flowing to all batteries connected in series in a single tray (for example, the currents $ic_1$ to $ic_{45}$) have the save values as the preset charging completion current value, charging may be completed.

A DC microgrid charge/discharge system according to embodiments of the present invention may be connected to a host PC, for example the control apparatus of FIG. 2, and may simultaneously control tens or hundreds of trays. In each of the trays, a plurality of batteries may be connected in series, as described above. Additionally, charging and discharging may be performed by a single bidirectional DC/DC converter, a single linear current source, a relay, and an active balancing circuit.

The above-described relay may be replaced by a switching circuit or a switching element having an equal function.

The above-described technical configuration according to embodiments of the present invention may have an effect of noticeably increasing an operating voltage by connecting a plurality of predetermined secondary batteries in series, of performing charging and discharging using a single bidirectional DC/DC converter and a linear current source (that is, a constant current source), and of dramatically increasing power efficiency by directly using discharged electricity in a DC form in a charging apparatus, unlike a conventional method of charging and discharging each of secondary batteries with relatively low voltages, for example, voltages of 2 V to 4.7 V.

Additionally, in a related art, the same number of power supplies for charging and discharging as the number of batteries is used. However, according to embodiments of the present invention, a single bidirectional DC/DC converter with a large capacity, and a single linear current source may be used and thus, it is possible to manufacture a compact and lightweight apparatus, and possible to reduce manufacturing costs and installation space.

In other words, a single large-capacity power supply for charging and discharging may require an extremely small size and weight, and may be installed in extremely small space, compared to a related art requiring the same number of power supplies for charging and discharging as the number of batteries.

Accordingly, charging and discharging of a plurality of batteries connected in series may be controlled by a single bidirectional DC/DC converter and a single linear current source, regardless of the number of the batteries. Thus, it is possible to increase or decrease capacity for charging and discharging based on an increase or decrease in the number of the batteries, to easily change a control program for charging and discharging that is loaded in a controller to control charging and discharging, and to facilitate calibration of equipment.

Embodiments of the present invention may provide an algorithm and a DC microgrid charge/discharge system with the algorithm that noticeably increases charge/discharge voltage by connecting a plurality of secondary batteries in series, compared to a single battery, that increases power conversion efficiency of a bidirectional DC/DC converter, that achieves optimum energy conversion efficiency by setting an appropriate voltage of a DC microgrid that directly uses discharged DC electricity to perform charging to be about twice a maximum voltage of a battery group, that increases power conversion efficiency of the DC microgrid charge/discharge system by configuring a DC ESS used for charge/discharge with a combination of a typical electrolytic condenser and a super condenser or a group of the secondary batteries, and that simplifies the DC microgrid charge/discharge system. Thus, it is possible to realize high energy conversion efficiency, and a compact and lightweight apparatus, thereby providing a very high industrial applicability.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A direct current (DC) microgrid charge/discharge system for a plurality of secondary batteries that are connected in series, the DC microgrid charge/discharge system comprising:
   a linear current source configured to permit charging and discharging of the plurality of secondary batteries;
   a single bidirectional DC-to-DC (DC/DC) converter configured to supply power to the plurality of secondary batteries for charging of the plurality of secondary batteries and to permit discharging of the plurality of secondary batteries at a high power conversion efficiency, wherein the linear current source is located between the bidirectional DC/DC converter and the plurality of secondary batteries, and wherein the bidirectional DC/DC converter operates at a voltage that is higher than a voltage of a single battery among the plurality of batteries; and
   a DC energy storage system (ESS) to stably supply power to the bidirectional DC/DC converter, the DC ESS being disposed in a front side of the bidirectional DC/DC converter, wherein the DC ESS supplies power during power outage.

2. The DC microgrid charge/discharge system of claim 1, further comprising:
   a controller to control the plurality of secondary batteries to be simultaneously charged and discharged, the plurality of batteries having different capacities and different characteristics comprising an internal resistance.

3. The DC microgrid charge/discharge system of claim 1, wherein a relay or a switching circuit is connected to a front end of each of the plurality of batteries, to supply a current to each of the plurality of batteries or to cut off the current, under a control of a controller to control the plurality of secondary batteries to be simultaneously charged, the plurality of batteries having different capacities and different characteristics comprising an internal resistance.

4. The DC microgrid charge/discharge system of claim 1, further comprising:
   a voltmeter or an isolated battery management system (BMS) to measure a voltage of both ends of each of the plurality of secondary batteries, to control the plurality of batteries to be simultaneously charged, the plurality of batteries having different capacities and different characteristics comprising an internal resistance.

5. The DC microgrid charge/discharge system of claim 2, wherein a control program is loaded in the controller, and is used to control each of the secondary batteries to be stably charged and discharged based on values received from an ammeter, a thermometer, and a voltmeter.

6. The DC microgrid charge/discharge system of claim 1, further comprising:
   a protection circuit to increase durability of a relay and to allow a charge/discharge current to stably operate when the relay is open and when the relay is connected to a contact after opening, to charge and discharge each of secondary batteries connected in series, the relay being installed between the batteries.

7. The DC microgrid charge/discharge system of claim 1, wherein the controller comprises a bidirectional zener diode or a diode, a condenser, and a resistor, and is configured to bypass a current to a battery in a next end when a relay is open and when the relay is connected to a contact after opening.

8. The DC microgrid charge/discharge system of claim 1, further comprising:
   an active balancing circuit to open and close a charging current of each of the plurality of secondary batteries based on a pulse width modulation (PWM) signal output from the controller, or to compute the PWM signal to a DC, to consume or bypass a part of the charging current, when the plurality of secondary batteries are charged in a constant voltage (CV) mode, the plurality of batteries being connected in series, and having different internal resistances or different capacities.

9. The DC microgrid charge/discharge system of claim 1, further comprising:

a host computer to simultaneously control a plurality of trays to perform charging and discharging, the plurality of trays being configured to charge and discharge the plurality of secondary batteries connected in series, using the bidirectional DC/DC converter and the linear current source.

* * * * *